US008407594B2

(12) United States Patent
Shintani et al.

(10) Patent No.: US 8,407,594 B2
(45) Date of Patent: Mar. 26, 2013

(54) SYSTEM AND METHOD FOR DYNAMICALLY ESTABLISHING EXTENDED DISPLAY IDENTIFICATION DATA

(75) Inventors: Peter Shintani, San Diego, CA (US); Ban Kawamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2561 days.

(21) Appl. No.: 10/896,690

(22) Filed: Jul. 22, 2004

(65) Prior Publication Data

US 2006/0017751 A1 Jan. 26, 2006

(51) Int. Cl.
*G06F 3/00* (2006.01)

(52) U.S. Cl. ........................................................ 715/722

(58) Field of Classification Search ................... 715/722
See application file for complete search history.

(56) References Cited

U.S. PATENT DOCUMENTS

| | | | | |
|---|---|---|---|---|
| 6,223,283 | B1 * | 4/2001 | Chaiken et al. | 713/1 |
| 6,600,747 | B1 | 7/2003 | Sauber | 370/395.64 |
| 6,721,881 | B1 * | 4/2004 | Bian et al. | 713/1 |
| 6,839,055 | B1 * | 1/2005 | Nguyen | 345/204 |
| 6,873,307 | B2 * | 3/2005 | Nitta et al. | 345/3.1 |
| 6,922,721 | B1 * | 7/2005 | Minborg et al. | 709/219 |
| 7,009,616 | B2 * | 3/2006 | Mendelson et al. | 345/519 |
| 7,176,980 | B2 * | 2/2007 | Stone et al. | 348/558 |
| 7,345,690 | B2 * | 3/2008 | Kim et al. | 345/581 |
| 2002/0036631 | A1 * | 3/2002 | Perez | 345/204 |
| 2002/0109669 | A1 * | 8/2002 | Ha | 345/156 |
| 2002/0113907 | A1 * | 8/2002 | Endo et al. | 348/730 |
| 2002/0135605 | A1 * | 9/2002 | Kim | 345/698 |
| 2003/0025685 | A1 | 2/2003 | Shirasaki et al. | 345/204 |
| 2003/0090590 | A1 | 5/2003 | Yoshizawa et al. | 348/569 |
| 2003/0097485 | A1 | 5/2003 | Horvitz et al. | 715/513 |
| 2003/0131069 | A1 * | 7/2003 | Lucovsky et al. | 709/217 |
| 2003/0131142 | A1 | 7/2003 | Horvitz et al. | 707/200 |
| 2004/0027357 | A1 * | 2/2004 | Mendelson et al. | 345/581 |
| 2004/0027515 | A1 | 2/2004 | Itakura | 439/110 |
| 2004/0061705 | A1 * | 4/2004 | Yoon et al. | 345/589 |
| 2004/0119731 | A1 | 6/2004 | Lee | 345/698 |
| 2004/0150648 | A1 * | 8/2004 | Kim et al. | 345/581 |
| 2005/0068346 | A1 * | 3/2005 | Ogawa et al. | 345/699 |
| 2005/0080939 | A1 * | 4/2005 | Onuma et al. | 710/8 |
| 2005/0086398 | A1 * | 4/2005 | Chuang | 710/16 |
| 2005/0212965 | A1 * | 9/2005 | Stone et al. | 348/558 |
| 2007/0186015 | A1 * | 8/2007 | Taft et al. | 710/16 |

OTHER PUBLICATIONS

DisplayConfigX for Mac Os X, http://web.archive.org/web/20040605195259/www.3dexpress.de/displayconfigx/index.html.*
PowerStrip 2.78, EnTech Taiwan, http://web.archive.org/web/20040325034310/www.entechtaiwan.net/util/ps.shtm.*

* cited by examiner

*Primary Examiner* — William Bashore
*Assistant Examiner* — Henry Orr
(74) *Attorney, Agent, or Firm* — John L. Rogitz

(57) ABSTRACT

Preferred format parameters including timing that is contained in an extended display information data (EDID) EEPROM in a digital video display system can be dynamically established by a user. In this way, when the video display system engages a source of video in a "plug and play" context, instead of communicating to the source what formats are supported and then accepting a format selected by the source, the preferred format is sent from the EEPROM to the source so that the video display system receives video from the source in the user-desired format.

15 Claims, 3 Drawing Sheets

GENERAL LOGIC

SPECIFIC IMPLEMENTATION #1

SPECIFIC IMPLEMENTATION #2

SYSTEM AND METHOD FOR DYNAMICALLY ESTABLISHING EXTENDED DISPLAY IDENTIFICATION DATA

FIELD OF THE INVENTION

The present invention relates generally to display systems and more particularly to establishing a preferred display format in an extended video display for requesting the preferred format from a video source.

BACKGROUND

Many modem video display systems can display video in more than one format, e.g. high definition or standard definition, using more than one aspect ratio. When this is the case, the source of video interprets this information and sends the display a particular format, depending on how the source has interpreted the display characteristics. The restriction on present systems is that the decision by the source regarding the format chosen to display the video data is automatic and may not necessarily be the one desired by the user. The user is thereby limited to the choice made by the source itself. This presents a problem when using current technology because, with high definition displays becoming more readily accessible, the user may wish to request that the source send video in a user-selected format instead of one chosen by the source for its own convenience. Furthermore, current processes to display certain data could undesirably include multiple format changes which inevitably introduce some features that impair picture quality of the data on display.

With more specificity using a non-limiting example, in an enhanced extended display identification database (E-EDID) device, formats that are supported by the device are listed and one of the listed formats can be marked as being the native timing of the display.

In general, the source device is required to read the contents of the video device over a specified channel. The source then interprets this data. The source then outputs a format, but as discussed above the source is not required to output a particular format. It is only required to output a format that is within the capabilities of the display device, as described in the EDID data. There is no requirement that the source device output the content in the format which matches the user's preferred timing of the display.

SUMMARY OF THE INVENTION

A method for establishing what format video is received from a source of video includes dynamically establishing at least one parameter that is associated with a user-preferred format in a memory of a video display system. The parameter is sent to the source to cause the source to send video to the display system in the desired format.

The parameter may be established in an extended display information data (EDID) electrically erasable programmable read-only memory (EEPROM) associated with the video display system. The parameter may be timing, scan lines, or aspect ratio, and can be communicated to the source in a plug-and-play operation.

In some embodiments the method may include allowing a user to select one parameter from a group of parameters stored in the EEPROM, with the EEPROM being altered as necessary to reflect the user selection. In other embodiments the method may include allowing a user to select one parameter from a group of parameters, with the EEPROM being dynamically altered as necessary to contain only the parameter selected by the user. In this latter embodiment a checksum associated with the EDID in the EEPROM is dynamically established to reflect the parameter selected by the user.

In another aspect, a video display system includes a processor and a format information storage apparatus. The processor presents to a user a visual display and then permits the user to use the visual display to define a preferred video format. The processor programs the format information storage apparatus such that the format information storage apparatus can indicate to a source of video the preferred video format. Consequently, the source sends video to the display system formatted in the preferred way.

In yet another aspect, a video display source includes a processor that receives information from a video display system. The information includes a parameter which is established in response to a user selecting a preferred display format. The processor of the video display source causes the source to send video data to the video display system in the preferred display format in response to the parameter.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
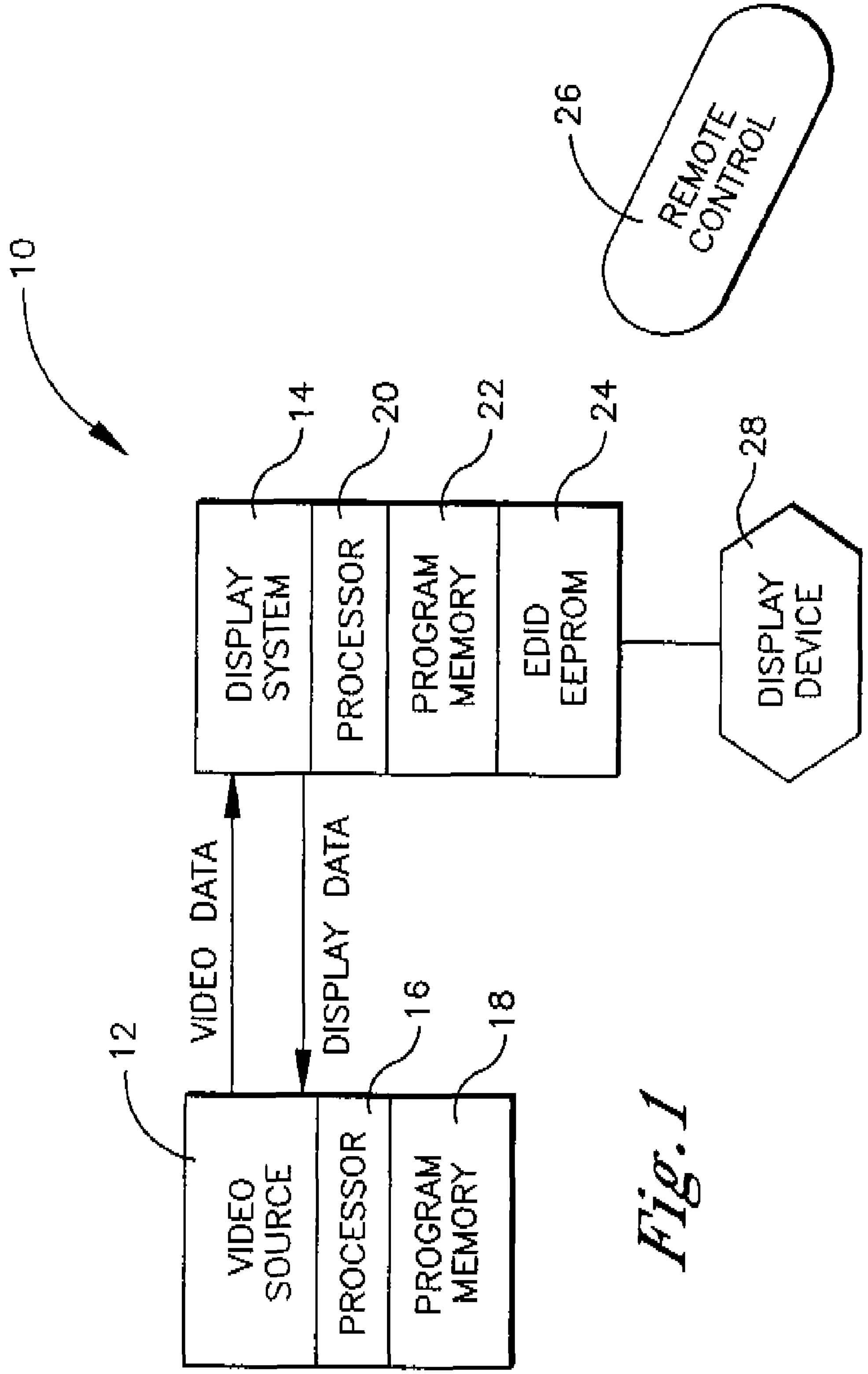
FIG. 1 is block diagram of the present system.

Referring initially to FIG. 1, a system is shown, generally designated 10, that includes a video source 12 and a digital display system 14, sometimes colloquially referred to as a "sink". As indicated in FIG. 1, the video source 12 communicates video data to the display system 14 for display of the video. Also, the source 12 can access display information at the display system 14 for purposes to be shortly disclosed.

As shown, the video source 12 includes a processor 16 that can access a program memory 18 to function in accordance with present principles. The program memory 18 can be any appropriate memory including, without limitation, disk and/or solid state memory.

As also shown in FIG. 1, the display system 14 may include a processor 20 that can access a program memory 22 to function in accordance with present principles. The program memory 22 can be any appropriate memory including, without limitation, disk and/or solid state memory.

In addition to or in lieu of the program memory 22, the display system 14 may access a format information storage apparatus, such as but not limited to an extended display information data (EDID) electrically erasable programmable read-only memory (EEPROM) 24. In accordance with present principles, the EEPROM 24 is dynamically changeable by a user to indicate a user-preferred format and if desired other display data for communication thereof to the video source 12. The user-definable preferred video format may be established by appropriately manipulating a remote control device 26, such as a TV remote control, in response to a format selection prompt that may be presented, along with video, on a monitor or display device 28.

In accordance with present principles, the video source 12 may be, without limitation, a DVD player, a satellite receiver, a set-top box, and so on. On the other hand, the display system 14 may be, without limitation, a television display system including a cathode ray tube (CRT) display, a liquid crystal display (LCD) or other flat-panel display, etc. The display system 14 is capable of displaying video in a user-selectable one of plural formats on the display device 28. These formats include various timings and related aspect ratios, e. and without limitation, 480 scans lines either progressive scan (480p) or interlaced output scan (480i), and 720 lines progressive scan, and 1,080 lines interlaced output scans, in conventional 16:9 aspect ratios or in high definition (HD) 4:3 aspect ratios. As is well known in the art, these format parameters are associated with respective "timings", i.e., the scan timing depends on, among other things, the number of scan lines and the aspect ratio.

Figure 2:
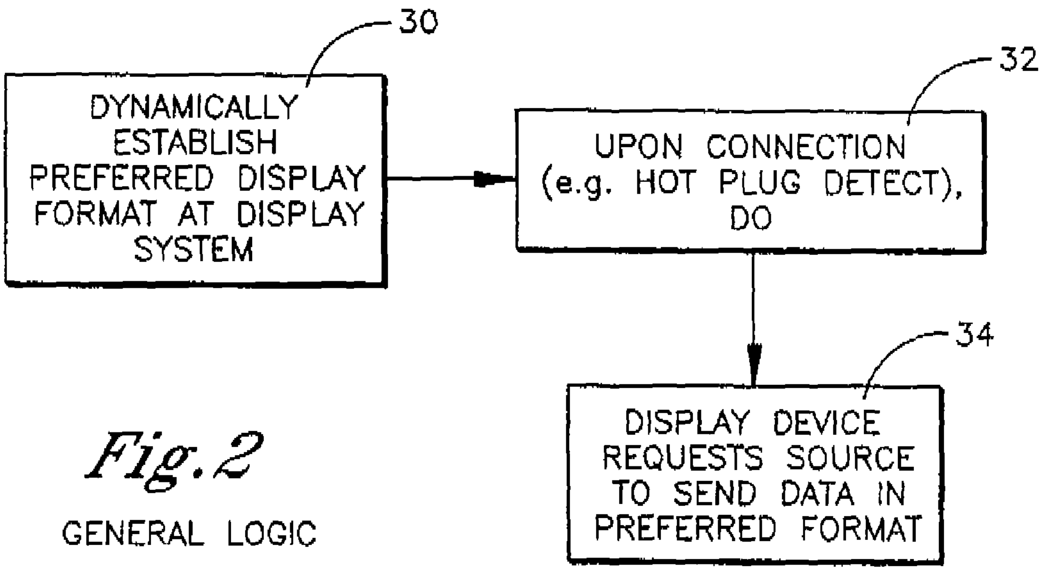
FIG. 2 is a flow chart of the general logic.

Now referring to FIG. 2, the general logic for dynamically establishing the display format is shown. Starting at block 30, the logic dynamically establishes the preferred display format at the display system. In one non-limiting embodiment, this may be done by allowing the user to appropriately enter information representing the user-preferred display format into the E-EDID data, e.g., information representing the user's preferred format in terms of timing and/or scan lines and/or aspect ratio. Upon plug and play connection, e.g. hot plug detect, a DO loop occurs at block 32, moving the logic to block 34. At block 34, the display device requests the video source to send data in the preferred format to be shown to the user. The preferred format may be established based on one of two of the specific implementation processes outlined in FIGS. 3 and 4.

In one exemplary non-limiting implementation, the logic at block 30 in FIG. 2 may be executed by setting a flag in block 0 of the EDID data which points to the first descriptor block in block 1. The first descriptor block can have a so-called "CEA" header having a table of short video format descriptors, and a bit in the descriptor that is preferred by the user may be set in accordance with the logic at block 30 of FIG. 2 to indicate that it is the preferred format.

Figure 3:
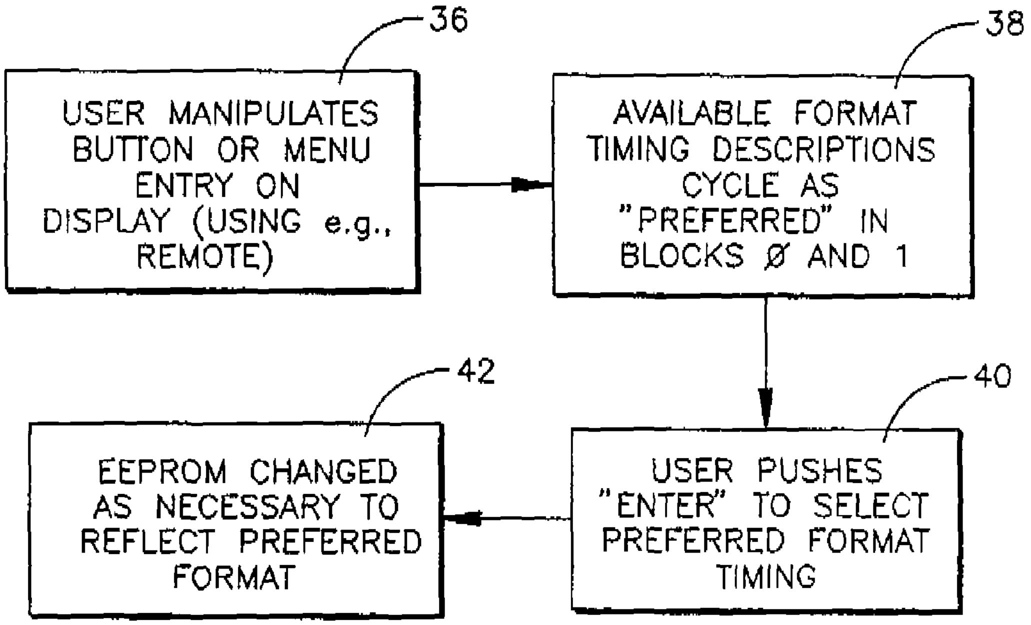
FIG. 3 is a flow chart of one implementation of the present logic.

FIG. 3 shows one specific implementation for allowing the user to define a preferred video format. At block 36, the user manipulates the button or menu entry on the video display (using the remote control 26 shown in FIG. 1 or other control device). Available format timing descriptions then cycle on the display screen as the "preferred" format as indicated at block 38. In one non-limiting implementation, the "preferred" format is reflected in block 0 of the E-EDID data. At block 40 the user selects, e.g., by pushing the "enter" button on the remote control device 26, the format timing preferred by the user. Block 42 shows that the EEPROM configurations are changed as necessary to reflect the preferred format requested. Video sent from the video source to the video display will then be in the user-specified format. In the particular implementation shown in FIG. 3, the EEPROM EDID data contains all the possible formats used by the display device, and identifies, for subsequent access by the source, the preferred format; accordingly, since all possible formats are always present in the EDID data in the EEPROM, the check sum of the EDID does not change.

An example of how to implement this method would be for the user to decide which format is desired before the beginning of the data display. This can be done upon display system startup at a formatting screen presented to the user before the "normal" viewing screen appears, where all the formatting options are presented to the user. The format chosen by the user' is then entered into the EEPROM for subsequent access by a video source in determining which video format to use.

Figure 4:
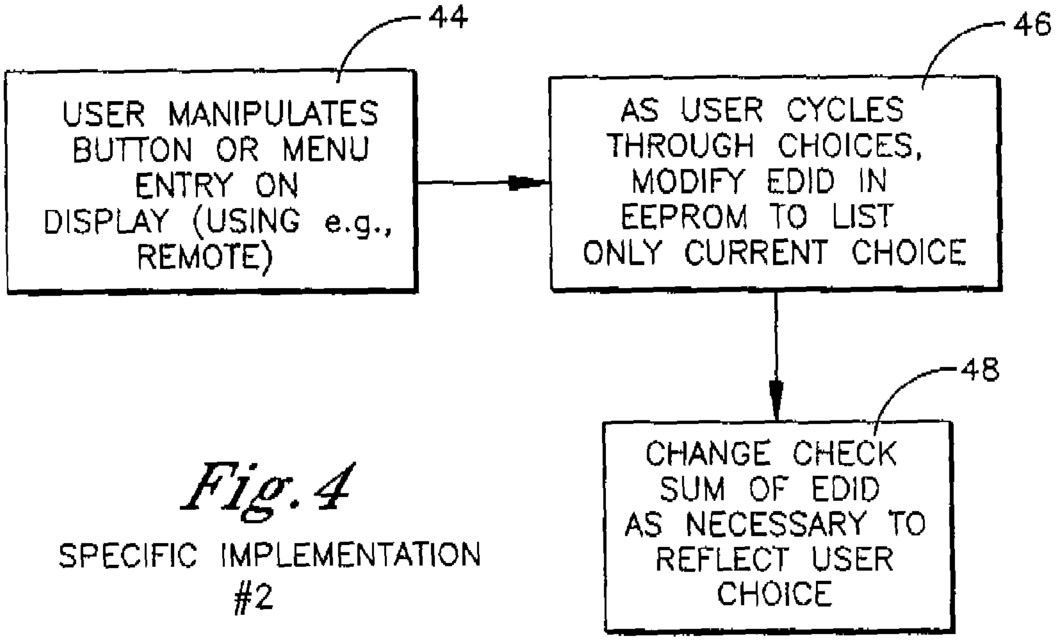
FIG. 4 is a flow chart of another implementation of the present logic.

A second method of specific implementation for establishing a preferred video format is shown in FIG. 4. Commencing at block 44, the user manipulates a button to select a menu entry on the display using, e.g., a remote control device to display different format options/choices. As the user cycles through the format choices, the EDID in the EEPROM is modified to list only the choice of format that is currently displayed on the video display screen, as indicated in block 46. As indicated at block 48, the check sum of the EDID is modified as necessary to reflect the user's format choice, since at the end of the selection process EDID data representing some non-preferred formats is eliminated from the EEPROM. In other words, this method outlines a procedure for "flipping" through the different format choices until one that is most acceptable to the user is displayed on the screen and exclusively entered into the EEPROM EDID data.

While the particular SYSTEM AND METHOD FOR DYNAMICALLY ESTABLISHING EXTENDED DISPLAY IDENTIFICATION DATA as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

We claim:

1. A method for establishing what format video is received from a source of video, comprising:

dynamically establishing at least one parameter associated with a user-preferred format in at least one memory of a video display system;

communicating at least the parameter to the source to cause the source to send video to the display system in the desired format; and allowing a user to select one parameter from a group of parameters, wherein the parameter selected by the user is indicated at least in part by block 0 of an extended display information data (EDID) embodied in an electrically erasable programmable read-only memory (EEPROM) associated with the video display system.

2. The method of claim 1, wherein the parameter is selected from the group consisting of: timing, scan lines, and aspect ratio.

3. The method of claim 1, wherein the parameter is communicated to the source in a plug-and-play operation.

4. The method of claim 3, comprising allowing a user to select one parameter from a group of parameters stored in the EEPROM, the EEPROM being altered as necessary to reflect the user selection.

5. A video display system including at least one processor and at least one format information storage apparatus, the processor executing logic comprising:

presenting, to a user, a visual display;

permitting the user to use the visual display to define a preferred video format; and programming the information storage apparatus such that the information storage apparatus can indicate to a source of video the preferred video format such that the source sends video to the display system in the preferred video format, a checksum associated with the preferred video format being dynamically established to reflect the parameter selected by the user.

6. The system of claim 5, wherein the information storage apparatus is an extended display information data (EDID) electrically erasable programmable read-only memory (EEPROM).

7. The system of claim 5, wherein the information storage apparatus is programmed in response to a user selection of a preferred format with information selected from the group consisting of: timing, scan lines, and aspect ratio.

8. The system of claim 7, wherein the information is communicated to the source in a plug-and-play operation.

9. The system of claim 8, wherein the processor allows a user to select one parameter from a group of parameters stored in the EEPROM, the EEPROM being altered as necessary to reflect the user selection.

10. The system of claim 8, wherein the processor allows a user to select one parameter from a group of parameters, the EEPROM being dynamically altered as necessary to contain only the parameter selected by the user.

11. A video display source, comprising:

at least one processor receiving information from a video display system, the information including at least one parameter established in response to a user selecting a preferred display format, the processor causing the source to send video data to the video display system only in the user-preferred display format in response to the parameter, a user being allowed to select one parameter from a group of parameters, wherein the processor automatically accesses block 0 of extended display information data (EDTD) in an EEPROM of the display system, block 0 pointing to a first descriptor block in block 1 of the EDID, the first descriptor block associated with at least one bit indicating a video display parameter that has been designated as being preferred by a user.

12. The display source of claim 11, wherein the processor automatically accesses the display system in response to detecting a plug-and-play signal.

13. The display source of claim 11, wherein the source is a DVD player.

14. The display source of claim 11, wherein the source is a television set-top box.

15. The display source of claim 11, wherein the source is a satellite receiver.

* * * * *